(12) United States Patent
Zhang et al.

(10) Patent No.: US 9,459,743 B2
(45) Date of Patent: Oct. 4, 2016

(54) TOUCH SENSING CIRCUIT, TOUCH SENSING METHOD, TOUCH SENSING PANEL AND TOUCH SENSING DISPLAY DEVICE (71) Applicants: BOE TECHNOLOGY GROUP CO., LTD., Beijing (CN); HEFEI BOE OPTOELECTRONICS TECHNOLOGY CO., LTD., Anhui (CN)

(72) Inventors: Jiuzhan Zhang, Beijing (CN); Ming Hu, Beijing (CN)

(73) Assignees: BOE TECHNOLOGY GROUP CO., LTD., Beijing (CN); HEFEI BOE OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 119 days.

(21) Appl. No.: 14/415,926

(22) PCT Filed: Jun. 30, 2014

(86) PCT No.: PCT/CN2014/081119
§ 371 (c)(1),
(2) Date: Jan. 20, 2015

(87) PCT Pub. No.: WO2015/074419
PCT Pub. Date: May 28, 2015

(65) Prior Publication Data
US 2016/0026286 A1 Jan. 28, 2016

(30) Foreign Application Priority Data

Nov. 22, 2013 (CN) .......................... 2013 1 0602761

(51) Int. Cl.
*G06F 3/044* (2006.01)
*G06F 3/041* (2006.01)
*G09G 3/36* (2006.01)

(52) U.S. Cl.
CPC ............ *G06F 3/044* (2013.01); *G06F 3/0412* (2013.01); *G09G 3/3648* (2013.01);
(Continued)

(58) Field of Classification Search
CPC .... G02F 1/167; G02F 1/13338; G06F 3/044; G06F 2203/04112; G06F 2203/04111; G06F 2203/04103; G09G 3/3655; G09G 3/3648; G09G 3/0412; G09G 2300/0439; G09G 2300/0426; G09G 2300/0852; G09G 2300/0478; G09G 2354/00
See application file for complete search history.

(56) References Cited

U.S. PATENT DOCUMENTS 5,945,972 A * 8/1999 Okumura ............. G09G 3/3648
345/100
6,714,268 B2 * 3/2004 Wang ....................... G09G 3/20
257/40

(Continued)

FOREIGN PATENT DOCUMENTS

| CN | 101276252 A | 10/2008 |
| CN | 101726890 A | 6/2010 |

(Continued)

OTHER PUBLICATIONS

International Search Report for International Application No. PCT/CN2014/081119.

*Primary Examiner* — Christopher E Leiby
(74) *Attorney, Agent, or Firm* — Nath, Goldberg & Meyer; Joshua B. Goldberg (57) ABSTRACT

The present invention provides a circuit, a method, a panel and a display device of touch sensing. The touch sensing circuit comprises a first gate line, a second gate line, data lines, a signal transmission line and a common electrode, the first gate line, the second gate line and the data lines defining a plurality of pixel units, each of the pixel units is provided therein with a first switch tube, a second switch tube and a third switch tube, and the signal transmission line being connected to a signal processor; the third switch tube is connected in series between the first switch tube and the second switch tube. The present invention improves the sensitivity of touch sensing.

11 Claims, 4 Drawing Sheets

(52) U.S. Cl.
CPC . *G09G 3/3655* (2013.01); *G06F 2203/04103* (2013.01); *G06F 2203/04111* (2013.01); *G06F 2203/04112* (2013.01); *G09G 2300/0426* (2013.01); *G09G 2300/0439* (2013.01); *G09G 2300/0478* (2013.01); *G09G 2300/0852* (2013.01); *G09G 2354/00* (2013.01)

(56) References Cited

U.S. PATENT DOCUMENTS

| | | | |
|---|---|---|---|
| 7,477,445 B2* | 1/2009 | Lee | G02F 1/167 345/102 |
| 9,214,107 B2* | 12/2015 | Fish | G09G 3/3233 |
| 2003/0076295 A1* | 4/2003 | Nakajima | G06F 3/03545 345/156 |
| 2005/0094038 A1* | 5/2005 | Choi | G06F 3/0412 349/12 |
| 2007/0257259 A1* | 11/2007 | Chen | G09G 3/3648 257/59 |
| 2010/0013794 A1* | 1/2010 | Abileah | G02F 1/13338 345/174 |
| 2011/0157505 A1 | 6/2011 | Liu | |
| 2012/0038585 A1* | 2/2012 | Kim | G06F 3/0412 345/174 |
| 2016/0041415 A1* | 2/2016 | Lin | G02F 1/13338 345/173 |

FOREIGN PATENT DOCUMENTS

| | | |
|---|---|---|
| CN | 101930132 A | 12/2010 |
| CN | 202120016 U | 1/2012 |
| CN | 103616971 A | 3/2014 |
| CN | 203643967 U | 6/2014 |

* cited by examiner

TOUCH SENSING CIRCUIT, TOUCH SENSING METHOD, TOUCH SENSING PANEL AND TOUCH SENSING DISPLAY DEVICE

This is a National Phase Application filed under 35 U.S.C. 371 as a national stage of PCT/CN2014/081119, filed Jun. 30, 2014, an application claiming the benefit of Chinese Application No. 201310602761.X, filed Nov. 22, 2013, the content of each of which is hereby incorporated by reference in its entirety.

FIELD OF THE INVENTION

The present invention relates the field of touch sensing technology, and particularly relates to a touch sensing circuit, a touch sensing method, a touch sensing panel and a touch sensing display device.

BACKGROUND OF THE INVENTION

Figure 1:
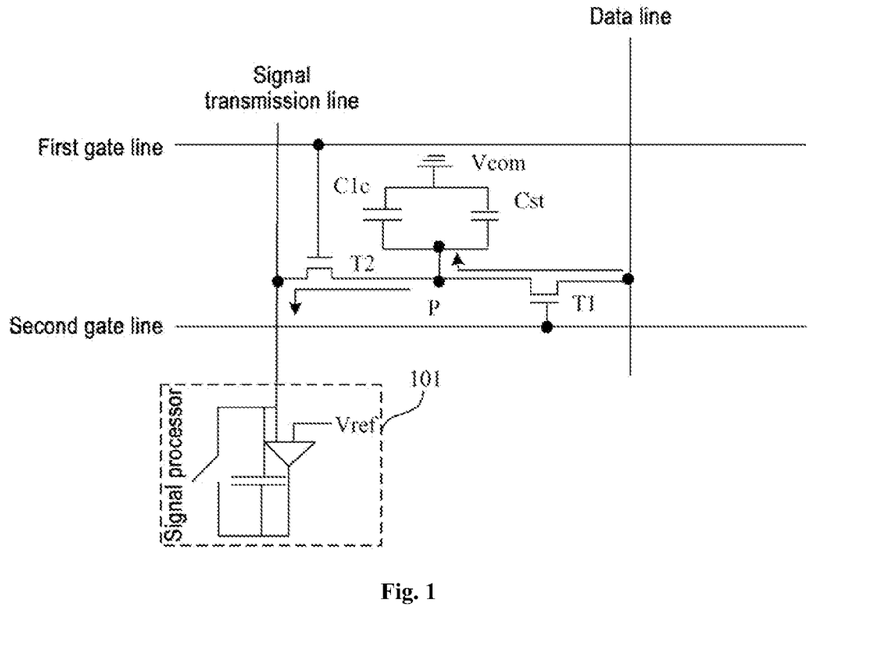
FIG. 1 is a schematic structural diagram of a touch sensing circuit in the prior art.
Figure 2:
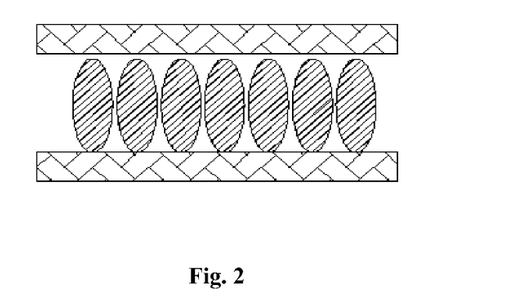
FIG. 2 is a schematic diagram of an arrangement of liquid crystal of a liquid crystal panel when no touch is performed.
Figure 3:
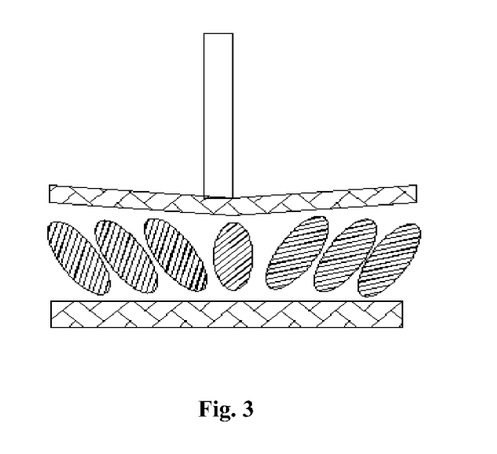
FIG. 3 is a schematic diagram of an arrangement of the liquid crystal of the liquid crystal panel when a touch is performed.

At present, in-cell touch screen has been widely used due to the advantages of realizing higher integration level of the whole panel, lightening and thinning the panel and the like as a result of integration in a sensing panel. The in-cell touch screen may be integrated with touch and sensing functions. FIG. 1 is a structural schematic diagram of a touch sensing circuit in the prior art. As shown in FIG. 1, the touch sensing circuit includes data lines, a first gate line, a second gate line, a signal transmission line, a liquid crystal capacitor Clc, a storage capacitor Cst, a common electrode, a signal processor, a thin film transistor T1 and a thin film transistor T2, wherein the source of the thin film transistor T1 is connected to the data lines, the gate of the thin film transistor T1 is connected to the second gate line, the drain of the thin film transistor T1 is connected to the source of the thin film transistor T2, the drain of the thin film transistor T2 is connected to the signal transmission line, and the gate of the thin film transistor T2 is connected to the first gate line. A second node P is formed at a junction of the thin film transistor T1 and the thin film transistor T2. The second node P is connected to one end of the liquid crystal capacitor Clc and one end of the storage capacitor Cst, while the common electrode is connected to the other end of the liquid crystal capacitor Clc and the other end of the storage capacitor Cst. The voltage provided by the common electrode is Vcom. FIG. 2 is a schematic diagram of an arrangement of liquid crystal of a liquid crystal panel when no touch is performed, and FIG. 3 is a schematic diagram of an arrangement of the liquid crystal of the liquid crystal panel when a touch is performed. It can be seen from FIG. 2 and FIG. 3 that, as the liquid crystal is an anisotropic medium, the liquid crystal capacitor Clc is related to the orientation and spacing of liquid crystal molecules. When a liquid crystal panel is touched, the capacitance of the liquid crystal capacitor Clc will be changed while the capacitance of the storage capacitor Cst will not be changed.

As shown in FIG. 1, the working principle of the touch sensing circuit is as follows: assuming that a voltage written into a pixel unit in a previous frame is Vp, the charge stored in the liquid crystal capacitor Clc and the storage capacitor Cst is:

$$Qp=Vp*(Cst+Clc).$$

When a high level is applied to the first gate line, the thin film transistor T2 is turned on, the voltage Vp at the second node is transmitted to the signal processor 101 via the signal transmission line, and then the signal processor compares the voltage Vp at the second node P with a reference voltage Vref so as to judge whether a touch is performed. Specifically, when no touch is performed, the voltage at the second node P is Vp; and when a touch is performed, the change in capacitance of the liquid crystal capacitor Clc is ΔClc, and the voltage at the point P is changed to Vp1'F=Vp*Clc/(Clc+ΔClc) according to the principle of charge conservation, so that the change in voltage at the point P when a touch is performed and when no touch is performed is:

$$\Delta Vp=Vp1'-Vp\approx Vp*\Delta Clc/(Cst+Clc)/(Cst+Clc).$$

It can be seen from the above equation that the value of ΔVp1 directly determines the sensitivity of touch detection.

The prior art has the following problem: the change ΔVp1 in voltage at the point P when a touch is performed and when no touch is performed is too small, thereby the sensitivity of touch sensing is reduced.

SUMMARY OF THE INVENTION

The present invention provides a touch sensing circuit, a touch sensing method, a touch sensing panel and a touch sensing display device, which may improve the sensitivity of touch sensing.

To achieve the above objective, the present invention provides a touch sensing circuit, including a first gate line, a second gate line, data lines, a signal transmission line and a common electrode, the first gate line, the second gate line and the data line defining a plurality of pixel units, each of the pixel units is provided with a first switch tube, a second switch tube and a third switch tube, and the signal transmission line is connected to a signal processor which is used for judging whether a touch action is performed according to the change in a signal;

the third switch tube is connected in series between the first switch tube and the second switch tube;

a first node is formed at a junction of the first switch tube and the third switch tube, a second node is formed at a junction of the second switch tube and the third switch tube, a first fixed capacitor is formed between the first node and the common electrode, and a second variable capacitor is formed between the second node and the common electrode; and the signal transmission line is connected to the second switch tube, and the data lines are connected to the first switch tube.

Optionally, the first switch tube includes an active layer pattern, a first gate, a first source and a first drain, the second switch tube includes an active layer pattern, a second gate, a second source and a second drain, and the third switch tube includes an active layer pattern, a third gate, a third source and a third drain; and the first source is connected to the data lines, the first drain and the third drain are connected to the first node, the third source and the second source are connected to the second node, the second drain is connected to the signal transmission line, the first gate and the third gate are connected to the second gate line, and the second gate is connected to the first gate line.

Optionally, the first gate, the second gate and the third gate are arranged in the same layer, and the first source, the second source, the third source, the first drain, the second drain and the third drain are arranged in the same layer.

Optionally, the first drain is connected to a first end of the first capacitor;

the second source is connected to a first end of the second capacitor;

the third source is connected to the first end of the second capacitor, and the third drain is connected to the first end of the first capacitor; and a second end of the first capacitor and a second end of the second capacitor are connected to the common electrode.

Optionally, each of the pixels units is also provided therein with a pixel electrode, and the first source of the first switch tube is connected to the signal transmission line through a first via hole; the second drain of the second switch tube is connected to the data lines through a second via hole, while the second source of the second switch tube is connected to the pixel electrode through a third via hole; and the third source of the third switch tube is connected to the pixel electrode through a fourth via hole.

Optionally, the common electrode, the first gate line and the second gate line are arranged in parallel and arranged in the same layer, the data lines are located above the first gate line and the second gate line, a source/drain pattern is formed above the common electrode, the source/drain pattern and the data lines are arranged in the same layer, and the source/drain pattern is located above the active layer pattern.

Optionally, a gate insulating layer is formed above the active layer pattern, a gate layer comprising the first gate, the second gate and the third gate are formed above the gate insulating layer, a middle layer is formed above the gate layer, a pixel electrode layer is formed above the middle layer, an insulating layer is formed above the pixel electrode layer, and a common electrode layer is formed above the insulating layer.

Optionally, when a touch is performed, the change in voltage at the second node is $\Delta Vp=Vp'-Vp \approx Vp*\Delta Clc/Clc$, wherein $Vp'$ is the change in voltage at the second node, $Vp$ is the initial voltage at the second node, $Clc$ is the initial capacitance of the second capacitor, and $\Delta Clc$ is the change in capacitance of the second capacitor.

The present invention further provides a touch sensing panel, including the above touch sensing circuit.

The present invention further provides a touch sensing display device, including the above touch sensing panel.

Optionally, the touch sensing display device further includes an opposite substrate opposing to the touch sensing panel and liquid crystal packaged between the touch sensing panel and the opposite substrate, the first capacitor is a storage capacitor, and the second capacitor is a liquid crystal capacitor.

The present invention further provides a touch sensing method based on the above touch sensing circuit, wherein the touch sensing circuit includes a first gate line, a second gate line, data lines, a signal transmission line and a common electrode, the first gate line, the second gate line and the data lines defining a plurality of pixel units, each of the pixel units is provided therein with a first switch tube, a second switch tube and a third switch tube, and the signal transmission line is connected to a signal processor; the third switch tube is connected in series between the first switch tube and the second switch tube; a first node is formed at a junction of the first switch tube and the third switch tube, a second node is formed at a junction of the second switch tube and the third switch tube, a first fixed capacitor is formed between the first node and the common electrode, and a second variable capacitor is formed between the second node and the common electrode; and the signal transmission line is connected to the second switch tube, and the data lines are connected to the first switch tube; and the touch sensing method includes:

the second switch tube is turned on under the control of the first gate line, a sensed signal is output to the signal processor via the signal transmission line, and the signal processor judges whether a touch action is performed according to the change in the signal; and the first switch tube and the third switch tube are turned on under the control of the second gate line, and then the data lines write a pixel voltage into both the first node and the second node.

In the touch sensing circuit, the touch sensing method, the touch sensing panel and the touch sensing display device provided by the present invention, a third switch tube is additionally provided in the touch sensing circuit, a first node is formed at a junction of the first switch tube and the third switch tube, a second node is formed at a junction of the second switch tube and the third switch tube, a first capacitor is formed between the first node and the common electrode, and a second capacitor is formed between the second node and the common electrode; and the signal transmission line is connected to the second switch tube. By additionally arranging the third switch tube in the touch sensing circuit, a pixel voltage is written into the pixel electrode via the data lines when the third switch tube is turned on; and when the third switch tube is cut off and when a touch is performed, the pixel voltage is changed, and the changed voltage signal is transmitted to the signal processing unit via the signal transmission line and is compared with a reference voltage in the signal transmission unit to judge whether a touch is performed, so that the sensitivity of touch sensing may be improved.

DETAILED DESCRIPTION OF THE EMBODIMENTS

To make those skilled in the art better understand the technical solutions of the present invention, the touch sensing circuit, the touch sensing method, the touch sensing panel and the touch sensing display device provided by the present invention will be further described below in details with reference to the accompanying drawings.

Figure 4:
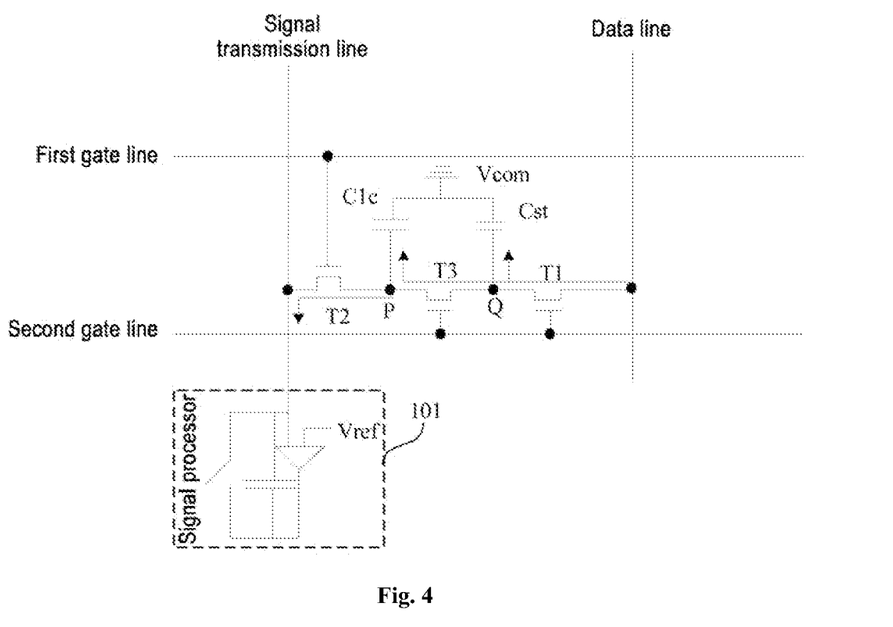
FIG. 4 is a schematic structural diagram of a touch sensing circuit provided by Embodiment 1 of the present invention.

FIG. 4 is an equivalent circuit diagram of a touch sensing circuit provided by Embodiment 1 of the present invention. As shown in FIG. 4, the touch sensing circuit includes a first gate line, a second gate line, data lines, a signal transmission line and a common electrode. The first gate line, the second gate line and the data lines define a plurality of pixel units. Each of the pixel units is provided therein with a first switch tube T1, a second switch tube T2 and a third switch tube T3. The signal transmission line is connected to a signal processor 101 which is used for judging whether a touch action is performed according to the change in a signal. The third switch tube T3 is connected in series between the first switch tube T1 and the second switch tube T2. A first node Q is formed at a junction of the first switch tube T1 and the third switch tube T3, and a second node P is formed at a junction of the second switch tube T2 and the third switch tube T3. A first fixed capacitor Cst is formed between the first node Q and the common electrode Vcom, and a second variable capacitor Clc is formed between the second node P and the common electrode Vcom. The signal transmission line is connected to the second switch tube T2, and the data lines are connected to the first switch tube T1.

Further, the first switch tube T1 includes an active layer pattern, a first gate, a first source and a first drain, the second switch tube T2 includes an active layer pattern, a second gate, a second source and a second drain, and the third switch tube T3 includes an active layer pattern, a third gate, a third source and a third drain, wherein the first source is connected to the data lines, the first drain and the third drain are connected to the first node Q, the third source and the second source are connected to the second node P, the second drain is connected to the signal transmission line, the first gate and the third gate are connected to the second gate line, and the second gate is connected to the first gate line.

Preferably, the first gate, the second gate and the third gate are arranged in the same layer, and the first source, the second source, the third source, the first drain, the second drain and the third drain are arranged in the same layer.

Specifically, the first drain of the first switch tube T1 is connected to a first end of the first capacitor Cst; the second source of the second switch tube T2 is connected to a first end of the second capacitor Clc; the third source of the third switch tube T3 is connected to the first end of the second capacitor Clc, and the third drain of the third switch tube T3 is connected to the first end of the first capacitor Cst; and both the second end of the first capacitor Cst and the second end of the second capacitor Clc are connected to the common electrode Vcom.

Preferably, when a touch is performed, the change in voltage at the second node P is $\Delta Vp=Vp'-Vp\approx Vp*\Delta Clc/Clc/Clc$, wherein $Vp'$ is the change in voltage at the second node P, $Vp$ is the initial voltage at the second node P, $Clc$ is the initial capacitance of the second capacitor, and $\Delta Clc$ is the change in capacitance of the second capacitor. When the gate line is turned on and applied with a high level, the second switch tube T2 is turned on. When a touch is performed, the voltage $Vp$ at the second node P is changed to $Vp'$. In this case, the change in voltage at the second node P when a touch is performed and when no touch is performed is $\Delta Vp=Vp'-Vp\approx Vp*\Delta Clc/Clc/Clc$. The voltage change $\Delta Vp$ is transmitted to the signal processing unit 101 via the signal transmission line, and then the signal processing unit 101 compares the voltage change $\Delta Vp$ with a reference voltage Vref so as to judge whether a touch is performed.

Figure 5:
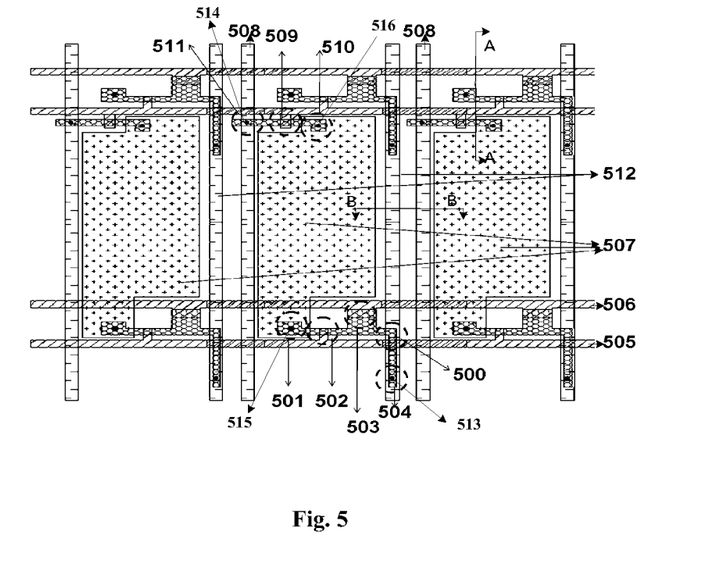
FIG. 5 is a schematic diagram of an application of the touch sensing circuit in Embodiment 1.
Figure 6:
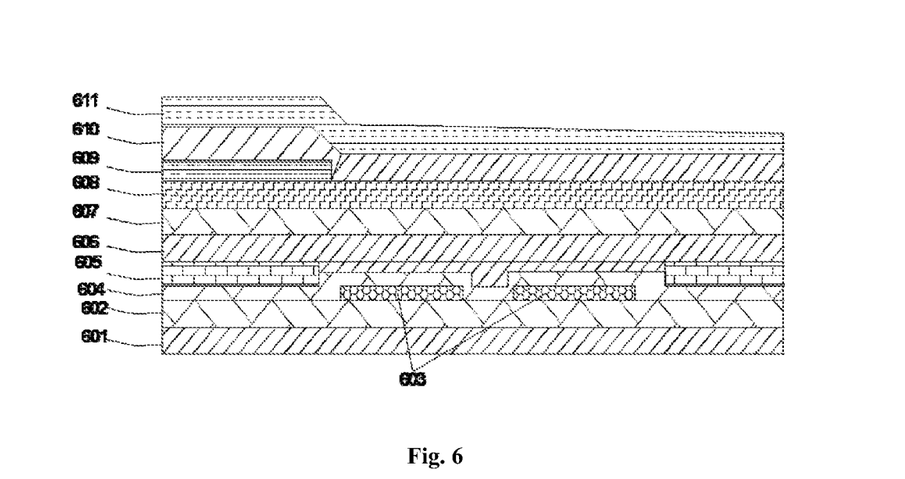
FIG. 6 is a sectional view taken along the line A-A in FIG. 5.
Figure 7:
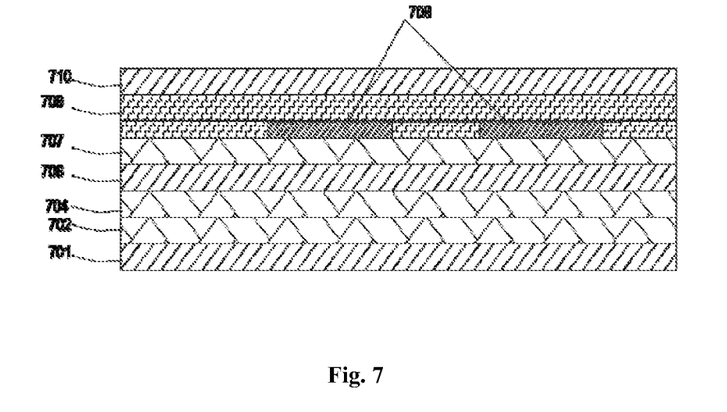
FIG. 7 is a sectional view taken along the line B-B in FIG. 5.

FIG. 5 is an diagram of an application of the touch sensing circuit in Embodiment 1, FIG. 6 is a sectional view taken along the line A-A in FIG. 5, and FIG. 7 is a sectional view taken along the line B-B in FIG. 5. As shown in FIGS. 5-7, the touch sensing circuit includes gate lines 505, data lines 508, signal transmission lines 512 and a common electrode 506. The gate lines 505 and the data lines 508 define a plurality of pixel units. Each of the pixel units is provided therein with a pixel electrode 507, a first switch tube 500, a second switch tube 509 and a third switch tube 502. The third switch tube 502 is connected to the first switch tube 500 and the second switch tube 509, a first node Q is formed at a junction of the first switch tube 500 and the third switch tube 502, and a second node P is formed at a junction of the second switch tube 509 and the third switch tube 502. A first capacitor 503 is formed between the first node Q and the common electrode Vcom. A first end of the first capacitor 503 is a source/drain pattern above an active layer pattern, wherein the active layer is made of polysilicon. The first end of the first capacitor 503 corresponds to the first node Q in FIG. 5, while a second end of the first capacitor 503 is the common electrode 506. A second capacitor Clc is formed between the second node P and the common electrode Vcom, and the signal transmission line 512 is connected to the second switch tube 509.

Wherein, each of the pixel units is also provided therein with a pixel electrode 507. A first source 504 of the first switch tube 500 is connected to the signal transmission line 512 through a first via hole 513. A second drain 511 of the second switch tube 509 is connected to the data lines 508 through a second via hole 514, while a second source 510 of the second switch tube 509 is connected to the pixel electrode 507 through a third via hole 516. A third source 501 of the third switch tube 502 is connected to the pixel electrode 507 through a fourth via hole 515.

In this embodiment, the common electrode, the first gate line and the second gate line are arranged in parallel and arranged in the same layer. The data lines are located above the first gate line and the second gate line. Specifically, the first gate line and the second gate line are described by taking the gate lines 505 as examples, then the common electrode 506 and the gate lines 505 are arranged in parallel and arranged in the same layer, an the data lines 508 are located above the gate lines 505. A source/drain pattern is formed above the common electrode 506. The source/drain pattern and the date lines 508 are arranged in the same layer. The source/drain pattern is located above an active layer pattern 603. A gate insulating layer 604 is formed above the active layer pattern 603. The gate insulating layer 604 may be made of, for example, a silicon oxide compound (SiOx). A buffer layer is formed below the active layer pattern 603. The buffer layer includes a silicon nitride compound (SiNx) 601 and a silicon oxide compound (SiOx) 602.

A gate layer 605 including the first gate, the second gate and the third gate is formed above the gate insulating layer 604, wherein the gate layer may be a single metal layer; or the gate layer may also be a composite metal layer, the material of the gate layer may be AlNd/Cr/CrNx, AlNd/Mo, Mo/AlNd/Mo, Al, Al/Mo or Mo/Al/Mo, or may consist of Cu and other buffer metals, such as Mo, Nb, Ti, etc. A middle layer is formed above the gate layer 605. The middle layer includes a silicon nitride compound (SiNx) 606 and a silicon oxide compound (SiOx) 607. An organic film layer 608 is formed above the middle layer. The organic film layer 608 plays a role of planarization and thus reduces the parasitic capacitance between the data lines 508 and the common electrode 506. A pixel electrode layer 609 is formed above the organic film layer 608, and an insulating layer 610 is formed above the pixel electrode layer 609. The insulating layer 610 may be made of, for example, a silicon nitride compound (SiNx). A common electrode layer 611 is formed above the insulating layer 610. Wherein, the pixel electrode layer 609, the insulating layer 610 and the common electrode layer 611 form a second capacitor Clc. The second capacitor Clc may be a liquid crystal capacitor. Wherein, a silicon nitride compound (SiNx) 701 and a silicon oxide compound (SiOx) 702 in FIG. 7 correspond to the silicon nitride compound (SiNx) 601 and the silicon oxide compound (SiOx) 602 in the buffer layer in FIG. 6 respectively, the gate insulating layer 704 in FIG. 7 corresponds to the gate insulating layer 604 in FIG. 6, the silicon nitride compound (SiNx) 706 and the silicon oxide compound (SiOx) 707 in FIG. 7 correspond to the silicon nitride compound (SiNx) 606 and the silicon oxide compound (SiOx) 607 in the middle layer in FIG. 6, the lines 708 in FIG. 7 correspond to the data lines 508 and signal transmission line 512 in FIG. 6, the organic film layer 709 in FIG. 7 corresponds to the organic film layer 609 in FIG. 6, and the silicon nitride layer 710 in FIG. 7 corresponds to the insulating layer 610 in FIG. 6, wherein the insulating layer 610 may be, for example, a silicon nitride compound (SiNx).

In this embodiment, preferably, the first switch tube T1, the second switch tube T2 and the third switch tube T3 are all N-type polysilicon thin film transistors. The active regions of the polysilicon thin film transistors are composed of polysilicon, and the sources and drains of the polysilicon thin film transistors are formed by ion doping, so the polysilicon thin film transistors have better conductivity and may reduce the size when being used as switch transistors. Of course, in this embodiment, amorphous silicon thin film transistors or oxide thin film transistors may also be employed.

The working principle of the touch sensing circuit of this embodiment will be described below in details with reference to FIG. 4 and FIG. 5. As shown in FIG. 4, assuming that a voltage written into the pixel unit in the previous frame is Vp, the charge stored in the liquid crystal capacitor Clc and the storage capacitor Cst is:

$Qp=Vp*(Cst+Clc)$.

Specifically, when no touch is performed, the voltage at the second node P is the voltage Vp written into the pixel unit in the previous frame; and when a touch is performed, the change in capacitance of the liquid crystal capacitor Clc is ΔClc. As the third switch tube T3 is cut off, according to the charge conservation, the voltage at the second node P is changed to:

$Vp2'=Vp*Clc/(Clc+\Delta Clc)$.

By the above equation, the change in voltage at the second node P when a touch is performed and when no touch is performed is:

$\Delta Vp2=Vp2'-Vp\approx Vp*\Delta Clc/Clc/Clc$.

In the prior art, the change in voltage at the second node P when a touch is performed and when no touch is performed is:

$\Delta Vp1=Vp1'-Vp\approx Vp*\Delta Clc/(Cst+Clc)/(Cst+Clc)$.

By comparison, in the case of the same change in capacitance of the liquid crystal capacitor Clc:

$\Delta Vp2/\Delta Vp1=(Cst+Clc)*(Cst+Clc)/Clc/Clc$.

If both the capacitance of the liquid crystal capacitor Clc and the capacitance of the storage capacitor Cst are 200 fF, ΔVp2/ΔVp1=4. That is, in the case of the same change in capacitance ΔClc of the liquid crystal capacitor, in the touch sensing circuit in this embodiment, the change in voltage at the second node P when a touch is performed and when no touch is performed is 4 times larger than that of the touch sensing circuit in the prior art, so that the sensitivity of touch sensing is improved.

In the touch sensing circuit provided by this embodiment, the touch sensing circuit includes gate lines, data lines, signal transmission lines and a common electrode, the gate lines and the data lines defining a plurality of pixel units, and each of the pixel units is provided with a pixel electrode, a first switch tube, a second switch tube and a third switch tube; the third switch tube is connected to the first switch tube and the second switch tube; a first node is formed at a junction of the first switch tube and the third switch tube, a second node is formed at a junction of the second switch tube and the third switch tube, a first capacitor is formed between the first node and the common electrode, and a second capacitor is formed between the second node and the common electrode; and the signal transmission line is connected to the second switch tube. By additionally arranging the third switch tube in the touch sensing circuit, a pixel voltage is written into the pixel electrode via the data lines when the third switch tube is turned on; and when the third switch tube is cut off and when a touch is performed, the pixel voltage is changed, and the changed voltage signal is transmitted to the signal processing unit via the signal transmission line and is compared with a reference voltage in the signal transmission unit to judge whether a touch is performed, so that the sensitivity of touch sensing may be improved.

Embodiment 2 of the present invention provides a touch sensing method. The touch sensing method is based on a touch sensing circuit. The touch sensing circuit includes a first gate line, a second gate line, data lines, a signal transmission line and a common electrode, the first gate line, the second gate line and the data lines defining a plurality of pixel units, each of the pixel units is provided therein with a first switch tube, a second switch tube and a third switch tube, and the signal transmission line is connected to a signal processor; the third switch tube is connected in series between the first switch tube and the second switch tube; a first node is formed at a junction of the first switch tube and the third switch tube, a second node is formed at a junction of the second switch tube and the third switch tube, a first fixed capacitor is formed between the first node and the common electrode, and a second variable capacitor is formed between the second node and the common electrode; the signal transmission line is connected to the second switch tube, and the data lines are connected to the first switch tube; and the touch sensing method includes:

S10: the second switch tube is turned on under the control of the first gate line, a sensed signal is output to the signal processor via the signal transmission line, and the signal processor judges whether a touch action is performed according to the change in the sensed signal; and S11: the first switch tube and the third switch tube are turned on under the control of the second gate line, and then the data lines write a pixel voltage into both the first node and the second node.

The touch sensing circuit in this embodiment is the touch sensing circuit in Embodiment 1, and the specific implementation thereof refers to Embodiment 1 and will not be repeated here.

In the touch sensing method provided by this embodiment, the touch sensing method is based on a touch sensing circuit. By additionally arranging the third switch tube in the touch sensing circuit, a pixel voltage is written into the pixel electrode via the data lines when the third switch tube is turned on; and when the third switch tube is cut off and when a touch is performed, the pixel voltage is changed, and the changed voltage signal is transmitted to the signal processing unit via the signal transmission line and is compared with a reference voltage in the signal transmission unit to judge whether a touch is performed, so that the sensitivity of touch sensing may be improved.

Embodiment 3 of the present invention provides a touch sensing panel, including a touch sensing circuit, wherein the touch sensing circuit may be the touch sensing circuit of Embodiment 1 and will not be repeated here.

The touch sensing panel provided by this embodiment includes a touch sensing circuit. By additionally arranging a third switch tube in the touch sensing circuit, a pixel voltage is written into the pixel electrode via the data lines when the third switch tube is turned on; and when the third switch tube is cut off and when a touch is performed, the pixel voltage is changed, and the changed voltage signal is transmitted to the signal processing unit via the signal transmission line and is compared with a reference voltage in the signal transmission unit to judge whether a touch is performed, so that the sensitivity of touch sensing may be improved.

Embodiment 4 of the present invention provides a touch sensing display device, including a touch sensing panel, wherein the touch sensing panel may be the touch sensing panel of Embodiment 3 and will not be repeated here.

Further, the touch sensing display device may further include: an opposite substrate opposing to the touch sensing panel, and liquid crystal packaged between the touch sensing panel and the opposite substrate, wherein the first capacitor is a storage capacitor, and the second capacitor is a liquid crystal capacitor.

The touch sensing display device provided by this embodiment includes a touch sensing circuit. By additionally arranging a third switch tube in the touch sensing circuit, a pixel voltage is written into the pixel electrode via the data lines when the third switch tube is turned on; and when the third switch tube is cut off and when a touch is performed, the pixel voltage is changed, and the changed voltage signal is transmitted to the signal processing unit via the signal transmission line and is compared with a reference voltage in the signal transmission unit to judge whether a touch is performed, so that the sensitivity of touch sensing may be improved.

It should be understood that, the implementations described above are merely exemplary implementations for describing the principle of the present invention, but the present invention is not limited thereto. A person of ordinary skill in the art may make various variations and improvements without departing from the spirit and essence of the present invention, and these variations and improvements shall be deemed as falling into the protection scope of the present invention.

The invention claimed is:

1. A touch sensing circuit, comprising a first gate line, a second gate line, data lines, a signal transmission line and a common electrode, the first gate line, the second gate line and the data lines define a plurality of pixel units, each of the pixel units is provided with a first switch tube and a second switch tube, the first switch tube is connected to the data lines, the second switch tube is connected to the signal transmission line, and the signal transmission line is connected to a signal processor which is used for judging whether a touch action is performed according to the change in a signal; wherein
the touch sensitive circuit further comprises a third switch tube, the third switch tube is connected in series between the first switch tube and the second switch tube; and
a first node is formed at a junction of the first switch tube and the third switch tube, a second node is formed at a junction of the second switch tube and the third switch tube, a first fixed capacitor is formed between the first node and the common electrode, and a second variable capacitor is formed between the second node and the common electrode.

2. The touch sensing circuit according to claim 1, wherein the first switch tube comprises an active layer pattern, a first gate, a first source and a first drain, the second switch tube comprises an active layer pattern, a second gate, a second source and a second drain, and the third switch tube comprises an active layer pattern, a third gate, a third source and a third drain; and
the first source is connected to the data lines, the first drain and the third drain are connected to the first node, the third source and the second source are connected to the second node, the second drain is connected to the signal transmission line, the first gate and the third gate are connected to the second gate line, and the second gate is connected to the first gate line.

3. The touch sensing circuit according to claim 2, wherein the first gate, the second gate and the third gate are arranged in the same layer, and the first source, the second source, the third source, the first drain, the second drain and the third drain are arranged in the same layer.

4. The touch sensing circuit according to claim 2, wherein the first drain is connected to a first end of the first capacitor;
the second source is connected to a first end of the second capacitor;
the third source is connected to the first end of the second capacitor, and the third drain is connected to the first end of the first capacitor; and
both a second end of the first capacitor and a second end of the second capacitor are connected to the common electrode.

5. The touch sensing circuit according to claim 4, wherein each of the pixels units is also provided therein with a pixel electrode, and the first source of the first switch tube is connected to the signal transmission line through a first via hole; the second drain of the second switch tube is connected to the data lines through a second via hole, while the second source of the second switch tube is connected to the pixel electrode through a third via hole; and the third source of the third switch tube is connected to the pixel electrode through a fourth via hole.

6. The touch sensing circuit according to claim 5, wherein the common electrode, the first gate line and the second gate line are arranged in parallel and arranged in the same layer, the data lines are located above the first gate line and the second gate line, a source/drain pattern is formed above the common electrode, the source/drain pattern and the data lines is arranged in the same layer, and the source/drain pattern is located above the active layer pattern.

7. The touch sensing circuit according to claim 6, wherein a gate insulating layer is formed above the active layer pattern, a gate layer comprising the first gate, the second gate and the third gate are formed above the gate insulating layer, a middle layer is formed above the gate layer, a pixel electrode layer is formed above the middle layer, an insulating layer is formed above the pixel electrode layer, a common electrode layer is formed above the insulating layer.

8. The touch sensing circuit according to claim 1, wherein when a touch is performed, the change in voltage at the second node is $\Delta Vp=Vp'-Vp \approx Vp*\Delta Clc/Clc$, wherein $Vp'$ is the change in voltage at the second node, $Vp$ is the initial voltage at the second node, $Clc$ is the initial capacitance of the second capacitor, and $\Delta Clc$ is the change in capacitance of the second capacitor.

9. A touch sensing display device comprising a touch sensing panel, the touch sensing panel comprising a touch sensing circuit which comprises a first gate line, a second gate line, data lines, a signal transmission line and a common electrode, the first gate line, the second gate line and the data lines define a plurality of pixel units, each of the pixel units is provided with a first switch tube and a second switch tube, the first switch tube is connected to the data lines, the second switch tube is connected to the signal transmission line, and the signal transmission line is connected to a signal processor which is used for judging whether a touch action is performed according to the change in a signal; wherein the touch sensitive circuit further comprises a third switch tube, the third switch tube is connected in series between the first switch tube and the second switch tube; and a first node is formed at a junction of the first switch tube and the third switch tube, a second node is formed at a junction of the second switch tube and the third switch tube, a first fixed capacitor is formed between the first node and the common electrode, and a second variable capacitor is formed between the second node and the common electrode.

10. The touch sensing display device according to claim 9, further comprising an opposite substrate opposing to the touch sensing panel and liquid crystal packaged between the touch sensing panel and the opposite substrate, the first capacitor is a storage capacitor, and the second capacitor is a liquid crystal capacitor.

11. A touch sensing method applied to a touch sensing circuit, wherein the touch sensing circuit comprises a first gate line, a second gate line, data lines, a signal transmission line and a common electrode, the first gate line, the second gate line and the data lines defining a plurality of pixel units, each of the pixel units is provided therein with a first switch tube, a second switch tube and a third switch tube, and the signal transmission line is connected to a signal processor; the third switch tube is connected in series between the first switch tube and the second switch tube; a first node is formed at a junction of the first switch tube and the third switch tube, a second node is formed at a junction of the second switch tube and the third switch tube, a first fixed capacitor is formed between the first node and the common electrode, and a second variable capacitor is formed between the second node and the common electrode; the signal transmission line is connected to the second switch tube, and the data lines are connected to the first switch tube; and the touch sensing method comprises:

the second switch tube is turned on under the control of the first gate line, a sensed signal is output to the signal processor via the signal transmission line, and the signal processor judges whether a touch action is performed according to the change in the sensed signal; and the first switch tube and the third switch tube are turned on under the control of the second gate line, and then the data lines write a pixel voltage into both the first node and the second node.

\* \* \* \* \*